United States Patent [19]

Morimura

[11] Patent Number: 4,610,219
[45] Date of Patent: Sep. 9, 1986

[54] FLOATING FRAME MEMBER FOR USE IN A FISH BREEDING APPARATUS

[75] Inventor: Shinji Morimura, Kanagawa, Japan

[73] Assignee: Bridgestone Corporation, Tokyo, Japan

[21] Appl. No.: 695,502

[22] Filed: Jan. 28, 1985

[51] Int. Cl.[4] ............................................. A01K 63/00
[52] U.S. Cl. ....................................................... 119/3
[58] Field of Search ........................................ 119/2–4

[56] References Cited

U.S. PATENT DOCUMENTS 4,084,543 4/1978 Pequegnat ............................... 119/3

FOREIGN PATENT DOCUMENTS 2125261 3/1984 United Kingdom ..................... 119/3

Primary Examiner—Jay N. Eskovitz
Attorney, Agent, or Firm—Sughrue, Mion, Zinn, Macpeak & Seas

[57] ABSTRACT

A floating frame member for use in a fish breeding apparatus, which is a hollow rod-shaped elastic body constituting a main part of a gas chamber therein, said elastic body being composed of rubber or rubbery elastic material and reinforced with fiber cords to have an outer diameter of about 279.4-about 609.6 mm (11–24 inches), a thickness of about 12.7–50.8 mm ($\frac{1}{2}$–2 inches) and a product between a Young's modulus and a sectional secondary moment of 100–3,000 kg·m$^2$, and having a ratio of circumferential stress to axial stress of 1.5–2.5 when an internal pressure of 0.1–20 kg/cm$^2$ is applied to said elastic body.

2 Claims, 5 Drawing Figures

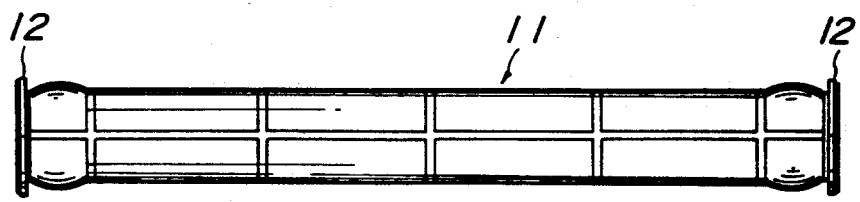
FIG_3
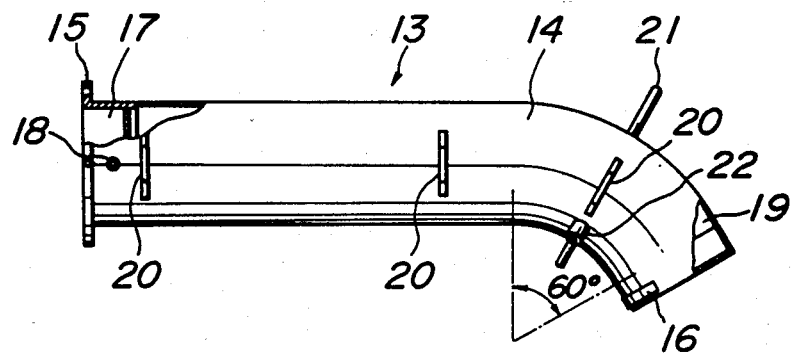
FIG_4
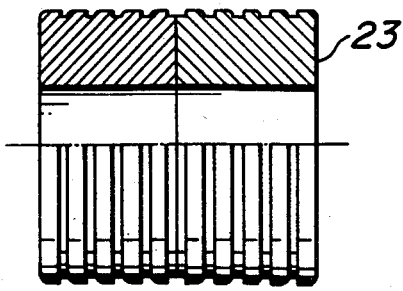
FIG_5

FLOATING FRAME MEMBER FOR USE IN A FISH BREEDING APPARATUS

BACKGROUND OF THE INVENTION (1) Field of the Invention

This invention relates to an improvement on a floating frame member for use in a fish breeding apparatus having a variety of favorable properties.

(2) Description of the Prior Art

In the fish breeding apparatus demarcating the sea with a net which is used for breeding or catching and preserving the fish and shellfish in the interior of the net, the net is hung and supported by a frame body floating on the surface of the sea. In order to enhance the efficiency in breeding or catching and hauling, it is necessary to provide a fish breeding apparatus having a large breeding capacity, particularly a larger plane projection area of the fish breeding apparatus.

However, to this end, a large-scale fish breeding apparatus is constituted by interconnecting a plurality of reinforced hoses each having a strain reinforcing layer embedded therein by means of straight couplings in such a way that the reinforced hoses may be curved to form a substantially circular form of as much as 30–100 m in diameter in its plane projection profile. It is possible to realize a large breeding capacity of 6–70 times larger than that of the fish breeding apparatus constituted by the rigid frame body, say, the steel pipes and the like. However, when the frame body of the former fish breeding apparatus using such reinforced hoses is taken in tow or is subjected to a strong tidal current in the ocean, a strong external force is applied to the frame body from a specified direction, so that the reinforced hoses forced into the initial bent posture by means of the straight coupling tends to restore the original linear state. Consequently, a crease with a small radius of curvature is produced in the vicinity of the straight couplings to cause kinking of the reinforced hoses constituting the frame body of the fish breeding apparatus, which may lead to the breakage of the hoses in the worst case.

The applicant has previously proposed in Japanese Utility Model Registration Application Laid Open No. 57-36,867 (Japanese Utility Model Registration Application No. 55-111,624) a fish breeding apparatus which can fully tolerate the towing and tidal current.

As shown in FIG. 1, this fish breeding apparatus is so constituted that rod-shaped reinforced elastic members 1 to be charged with a gas are interconnected by means of bent couplings 2 to form a frame body 3 in a polygonal shape having 4–30 sides, in this example, in a hexagonal form; a fitting portion 5 for mooring rope 4 is provided on each bent coupling 2; and nets 6 are hung from the frame body 3 of the fish breeding apparatus.

SUMMARY OF THE INVENTION

The invention is a further development of a floating frame member as elastic reinforcement in such a conventional fish breeding apparatus. More particularly, the invention is to provide a floating frame member for use in a large-scale fish breeding apparatus capable of being installed in the ocean which member can satisfy various requirements needed as the constituent parts of the frame body of such a fish breeding apparatus.

According to the present invention, there is a provision of a floating frame member for use in a fish breeding apparatus, which is a hollow rod-shaped elastic body constituting a main part of a gas chamber therein, said elastic body being composed of rubber or rubbery elastic material and reinforced with fiber cords to have an outer diameter of about 279.4–about 609.6 mm (11–24 inches), a thickness of about 12.7–50.8 mm ($\frac{1}{2}$–2 inches) and a product between a Young's modulus and a sectional secondary moment of 100–3,000 kg·m$^2$, and having a ratio of circumferential stress to axial stress of 1.5–2.5 when an internal pressure of 0.1–20 kg/cm$^2$ is applied to said elastic body.

BRIEF DESCRIPTION OF THE DRAWINGS

The invention will be described in more detail with reference to the accompanying drawings, wherein:

FIG. 3 is a front view illustrating an embodiment according to the invention;

FIG. 4 is a front view illustrating a bent coupling; and

FIG. 5 is a partially sectional view illustrating a float.

DETAILED DESCRIPTION OF THE INVENTION

Figure 1:
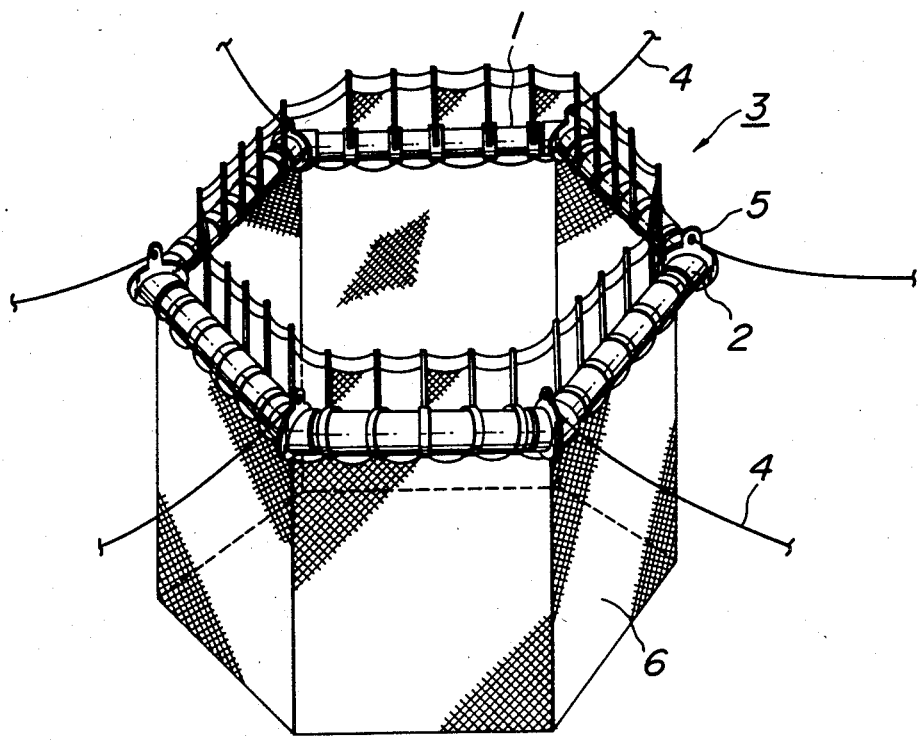
FIG. 1 is an oblique view illustrating a fish breeding apparatus to which the invention is applicable.

The conditions required for a fish breeding frame body, and in turn, the floating frame member, are enumerated below;

(1) To possess enough surf-riding property to follow the wave surface of a relatively large wave in the ocean without being broken thereby.

(2) To possess such rigidity as to be free from any abnormal deformation at the fish breeding frame body as well as anti-kinking property even when an external force is applied by tidal current in the ocean or by towing the frame body at about 5 knots;

(3) To possess such a restoration property as to restore its original profile even if the frame body is bent by the action of an external force which cannot be expected in the case of the ordinary tidal current or towing;

(4) To possess enough surplus buoyancy to support the weight of nets, workers, accessories and the like;

(5) To possess enough shock-resisting property against mooring, berthing, etc., of a working vessel; and (6) To possess a profile-retaining property which always allows the maintenance of a constant length and diameter irrespective of the application of an internal pressure for the effective prevention of the breakage of the hung nets and the prevention of slacking of studs for balustrade and the like which are attached around the axis of the floating frame member, against the leakage of gas due to puncture or the like.

To this end, upon a variety of experiments, the inventors have found that the following characteristics should be met in order that the floating frame member may satisfy the above requirements.

(a) With respect to the surf-riding property, rigidity and anti-kinking property, it was found through a simulation test in a water pool that it is necessary for the floating frame member to have the product between the Young's modulus and the sectional secondary moment (hereinafter referred to as "EI") in a range of $10^3$–$10^4$ kg·m$^2$, preferably 5,000 kg·m$^2$. If the EI is in this range, no practical problem results with respect to the above three properties.

(b) The restoration property can be fully secured by use of fiber cords as reinforcing material.

(c) It is necessary for the buoyancy to possess not less than 50 kg/m of surplus buoyancy.

(d) The shock-resisting property can be secured by a gas-charged hollow construction of rubber or rubbery elastic material body of which material and structure have elasticity.

(e) The profile-retaining property can be secured when the ratio of the circumferential stress to the axial stress under an internal pressure is within a range of 1.5–2.5 even if the floating frame member is made of rubber or a rubbery elastic body reinforced with fiber cords.

Under the protection of the above matters, the invention provides a floating frame member having the above all performances which can fully satisfy all the requirements as enumerated above. More particularly, the restoration property can be conferred by making the elastic body constituting the main part of a gas chamber from rubber or a rubbery elastic material while being reinforced with organic or inorganic fiber cords. A desired surplus buoyancy can be conferred by designing the outer diameter of this reinforced elastic body at about 279.4–about 609.6 mm (11–24 inches). Enough shock-resisting property can be obtained by designing the thickness of this reinforced elastic body which is intended to be charged with a gas such as nitrogen gas, air or the like at about 12.7–about 50.8 mm (½–2 inches). Moreover, the surf-riding property, rigidity and anti-kinking property which is satisfied in case of the EI of the reinforced elastic body being $10^3$–$10^4$ kg·m$^2$ after the internal pressure is applied can be conferred by selecting the material of the elastic member and the number of layers and the inclination angle of the fiber cords in such a manner that the EI of the reinforced elastic member itself may be set in a range of 100–3,000 kg·m$^2$, and setting the charged pressure of the reinforced elastic body at 0.1–20 kg/cm$^2$. Further, the profile-retaining property which always allows the maintenance of a constant length and diameter can be conferred when the ratio of the circumferential stress to the axial stress is in a range of 1.5–2.5 under an internal pressure upon the reinforced elastic body.

Now, the reasons for the above specified limitations will be described in the following:

The reason why the outer diameter of the reinforced elastic body is set within a range of about 279.4–609.6 mm (11–24 inches) is that if it is less than about 279.4 mm, the surplus buoyancy of 50 kg/m can not be obtained, while if it exceeds about 609.6 mm, it is disadvantageous from the economical standpoint. Meanwhile, the reason why the thickness of the reinforcing elastic body is set within a range of about 12.7 to about 50.8 mm (½–2 inches) is that if it is less than about 12.7 mm, it is difficult to maintain the anti-kinking property in connection with the shock-resisting property, the EI value of the reinforced elastic member itself and the stress ratio at the time when the internal pressure is charged, while if it is over about 50.8 mm, it leads to economical loss.

Figure 2:
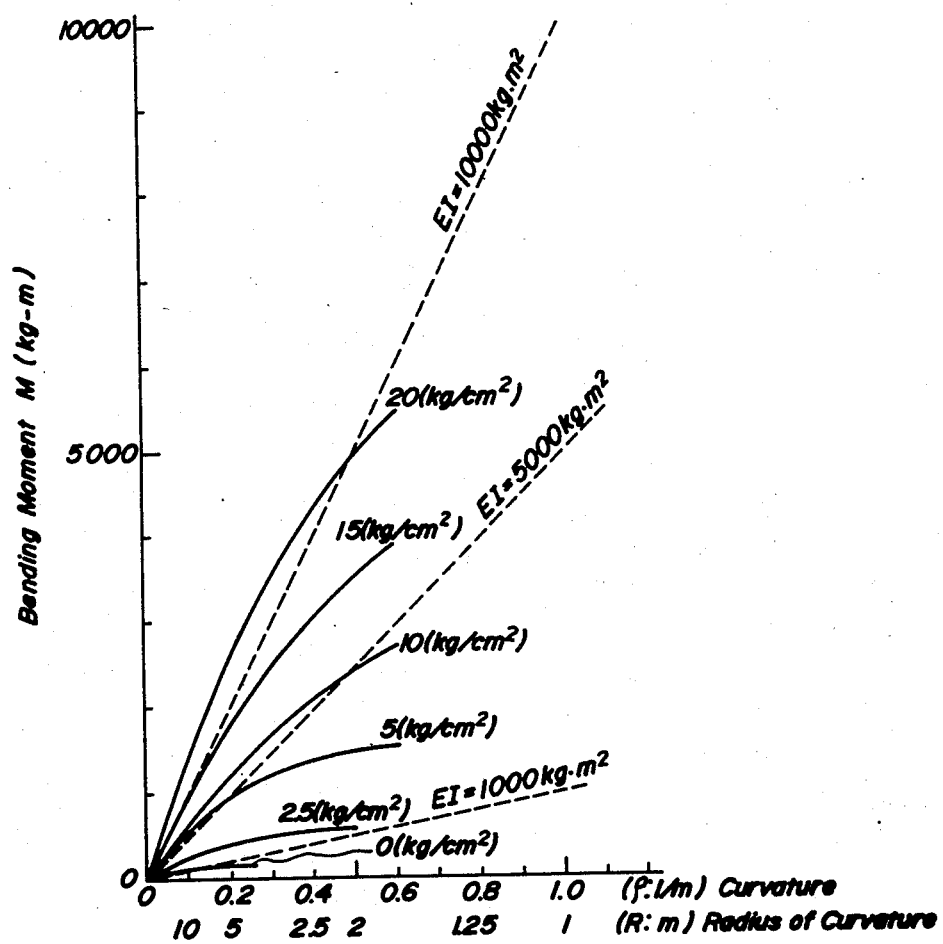
FIG. 2 is a graph illustrating the relation among the curvature, the bending moment and the product EI.

The reason why fiber cords are employed as the reinforcing material is that the fiber cords composed of the stranded cords of organic fiber, inorganic fiber, metal fiber or the like possess enough elastically restorative force without being broken or plastically deformed even when the reinforcing elastic body is bent. The reason why the charging pressure is limited to 0.1–20 kg/cm$^2$ is that as obvious from the graph in FIG. 2 showing the relation among the curvature, the bending moment and the EI wherein, by way of example, the reinforced elastic member has the outer diameter of 428 mm and the thickness of 24 mm, and is composed of an inner rubber layer, eight cord layers, intermediate rubber layer, four cord layers, and an outer rubber layer as piled in this order with EI = 1,000 kg·m$^2$, the above range is determined so as to set the EI after it is charged with, for instance, nitrogen at $10^3$–$10^4$ which satisfies the above various performances. Note is to be taken that the above value of 0.1 is the case where even a slight amount of nitrogen gas is charged. It is confirmed that as the EI value of the reinforced elastic member itself is increased, the gradient of the curve is larger.

Therefore, it is necessary to selectively adopt the charging pressure as well as the EI value of the reinforced elastic member itself in order to obtain the desired EI value after gas charging. If the EI value is less than 100 kg·m$^2$, it is impossible to obtain an appropriate rigidity even the internal pressure is increased, but within a pressure-tolerable range determined by taking the safety of the rubber frame structure into account, while if it exceeds 3,000 kg·m$^2$, it becomes unnecessary to apply an internal pressure and the economical merit of the system according to the invention through the application of the internal pressure is lost. Therefore, the value is set within a range of 100–3,000 kg·m$^2$.

FIG. 3 is an enlarged view illustrating a floating frame member thus constituted, with the outer diameter of 437 mm, the thickness of 28.5 mm, the entire length of 12.5 m, the internal charged pressure of 5 kg/cm$^2$, the weight of 700 kg, and the surplus buoyancy of 100 kg/m. The floating frame member 11 has at its each end a rigid flange 12 which is to be air-tightly secured to a bent coupling by vulcanization adhesion.

FIG. 4 is a partially sectional front view of a bent coupling to which the floating frame member 11 is to be connected. As a matter of course, the shape of the bent coupling may be selectively determined depending upon the number of the floating frame members 11 required. The bent coupling 13 as shown in FIG. 4 has a flange 15 which is provided at one end of the coupling body 14 and is to be air-tightly connected to the rigid flange 12, while a connection lobe 16 is provided at the curved end of the bent coupling body 14 curved at 60°. The connection lobe 16 is to be connected to another straight or bent coupling. The bent coupling 13 has a partition chamber 17 formed inside of coupling body 14 which communicates with the interior of the floating frame member and a supply/discharge opening 18 which is adapted to charge a gas into the floating frame member 11 through the partition chamber 17.

The bent coupling 13 has also an air chamber 19 formed between the partition chamber 17 and the curved end, which air chamber prevents the penetration of the sea water into the inside of the bent coupling.

Numerals 20, 21 and 22 in this figure denote a hook used as a handle at working such as assembling or conveying, a hook as a fitting portion for the mooring rope, and a stud support respectively.

In assembling the frame body of the fish breeding apparatus by the floating frame members 11 and the bent couplings 13, each rigid flange 12 provided at each of the ends of the floating frame member 11 is connected to the bent coupling 13 having an appropriate shape through a sealing material in such a way that an independent gas chamber may be constituted by the hollow space of the floating frame member 11 and the partition chamber 17 of the bent coupling 13. The independent gas chamber provides some merits, for instance, even if the gas is leaked from one floating frame member 11, no influence is extended upon the other gas chambers. After the above are connected, the required number of floating frame members 11 are interconnected with one another by means of the bent couplings 13, while a gas such as air or nitrogen is charged into each gas chamber at a range of 0.1-20 kg/cm$^2$ through a valve (not shown) from the supply/discharge opening 18.

It is preferable that the fish breeding apparatus thus constituted is attached with floats 23 made of foamed styrol to secure the necessary buoyancy. Further, it is also preferable that such a float 23 is covered with a cloth covering for the protection thereof from the breakage.

Lastly, this fish breeding frame body is provided with nets, balustrates, supports for nets preventing the jumping-over of the fishes, mooring ropes and the like.

For the above constituent features, particularly of the floating frame member, the fish breeding apparatus of the invention exhibits the surf-riding property, rigidity and anti-kicking property in use and towing in the ocean, while it does the restoration property as well as the surplus buoyancy and the shock-resisting property in feeding baits, etc. Further, because of the profile-retaining property of the floating frame members, it is assuredly possible to prevent breakage of the net and the pulling-down of the balustrates and the nets for preventing the jumping-over of the fishes in the case of the gas leakage.

Therefore, according to the invention, the hollow rod-shaped elastic body constituting the main part of the gas chamber is made of rubber or rubbery elastic material, while it is reinforced with the fiber cords, the outer diameter of the reinforced elastic member being in a range of about 279.4-about 609.6 mm, the thickness thereof being in a range of about 12.7-about 50.8 mm, the EI of the reinforced elastic member itself being in a range of 100-3,000 kg·m$^2$, the internal charged pressure of the reinforced elastic member being set in a range of 0.1-20 kg/cm$^2$, and the ratio of the circumferential stress to the axial stress of the reinforced elastic body at the time of internal pressure applied being set at 1.5-2.5. Thereby, sufficient surf-riding property, rigidity, the anti-kinking property, the surplus buoyancy, the shock-resisting property and the profile-retaining property can be obtained, so that the invention has the large merits that the fish breeding apparatus can be large-scaled for use in the ocean, and that it can be suited for towing.

What is claimed is:

1. A floating frame member for use in a fish breeding apparatus, which is a hollow rod-shaped elastic body constituting a main part of a gas chamber therein, said elastic body being composed of rubber or rubbery elastic material and reinforced with fiber cords to have an outer diameter of about 279.4-about 609.6 mm (11-24 inches), a thickness of about 12.7-50.8 mm ($\frac{1}{2}$-2 inches) and a product between a Young's modulus and a sectional secondary moment of 100-3,000 kg·m$^2$, and having a ratio of circumferential stress to axial stress of 1.5-2.5 when an internal pressure of 0.1-20 kg/cm$^2$ is applied to said elastic body.

2. A fish breeding apparatus comprising:
a frame body; and
net hanging from the frame body to form a top-opened net enclosure for breeding fish;
said body frame comprising plural rod-shaped reinforced elastic members charged with a gas and bent couplings air-tightly interconnecting said elastic members, said floating frame members each being a hollow rod-shaped body constituting a main part of a gas chamber therein, said elastic body being composed of rubber or rubbery elastic material and reinforced with fiber cords to have an outer diameter of about 279.4 to about 609.6 mm (11-24 inches), a thickness of from about 12.7 to 50.8 mm ($\frac{1}{2}$ to 2 inches) and a product between a Young's modulus and a sectional secondary moment of 100 to 3,000 kg·m$^2$, and having a ratio of circumferential stress to axial stress of 1.5 to 2.5 when an internal pressure of 0.1 to 20 kg/cm$^2$ is applied to said elastic body.

* * * * *